March 19, 1963 T. F. MACALL 3,081,824

MOUNTING UNIT FOR ELECTRICAL COMPONENTS

Filed Sept. 19, 1960

INVENTOR.
THOMAS F. MACALL
BY
Miketta and Glenny
ATTORNEYS.

United States Patent Office 3,081,824
Patented Mar. 19, 1963

3,081,824
MOUNTING UNIT FOR ELECTRICAL COMPONENTS

Thomas F. Macall, Panorama City, Calif., assignor to Behlman Engineering Company, Burbank, Calif., a corporation of California
Filed Sept. 19, 1960, Ser. No. 57,044
8 Claims. (Cl. 165—179)

The present invention relates to an efficient, multi-functional, extruded metal unit adapted to provide chassis, conductors and heat sink for electronic components. It is particularly directed to a compact, self-aligning unit in which a coolant fluid (either liquid or gas) is contained, separated and isolated from the circuitry which associates and connects the various electronic components mounted upon the unit.

It is well known that the characteristics of transistors, semi-conductors and other electrical components vary with temperature. For example, the intrinsic conductance of semi-conductors, such as silicon and germanium, is low at low temperatures but conductance is about double by every ten degrees C. rise in temperature. At temperatures above 20° C.–30° C. the rise is quite rapid and in operation "thermal runaway" may burn out the semi-conductor. With increase in temperature resistance drops, rectification may be impaired, reverse currents are greatly increased, capacitance drops rapidly and breakdown may occur. Drift in operating point may render the entire circuit or piece of equipment ineffective. Although heat is generated by power loss in semi-conductor devices and specific attention has been called to such devices, all electrical components are adversely affected by changes in temperature and optimum operating conditions require a maintenance of the entire unit within a relatively narrow range in order to attain optimum effectiveness.

It is undesirable to subject the entire circuitry to the action of a coolant. The present invention provides a unit capable of being used as a chassis upon which various components may be mounted in close proximity to one another and thereby obtain a very compact, complete electrical unit. At the same time, the device of the present invention permits the coolant to be contained and isolated within a predetermined channel so that the circuitry itself is not exposed to the action of the coolant and may be potted or covered with a suitable resilient dielectric to produce a completed electronic or electrical device which is resistant to vibration, shock, or other adverse external conditions.

The electrical devices which may be made by the use of the multi-functional extruded metal units of the present invention are legion; numerous industrial electrical devices, military devices, instruments and the like, including rectifiers, inverters, power sources, power control dividers, signal and pulse generators, switching devices, voltage doublers, sextuplers, etc. may be made by the use of these units.

Generally stated, the invention contemplates a multi-functional, integral, extruded metal unit which is adapted to provide a chassis, a conductor and a heat sink for electronic components. This unit is particularly well adapted to produce compact and self-aligning, self-contained electrical devices. The unit is inexpensive since it is made from a metallic extrusion and each unit in effect consists of two members, the members and units being capable of nesting and mating with one another so as to provide a complete bank of electrical components of any desired size or length with one or more self-contained, separated and isolated conduits for coolant.

An object of the present invention, therefore, is to disclose and provide a multi-functional, extruded metal unit adapted to provide chassis, conductors and heat sink for electronic components used in electrical devices.

A further object of the invention is to disclose and provide a multi-functional, extruded metal unit capable of being used as a chassis element and adapted to provide enclosed passages for coolant, whereby the circuitry is not exposed to the action of the coolant.

These and other objects, advantages and modifications of the invention will become apparent from the following description of certain exemplary forms which the unit of the present invention may assume. In order to facilitate understanding, reference will be had to the appended drawings, in which.

Figures 1, 2, 3, 4, 5:
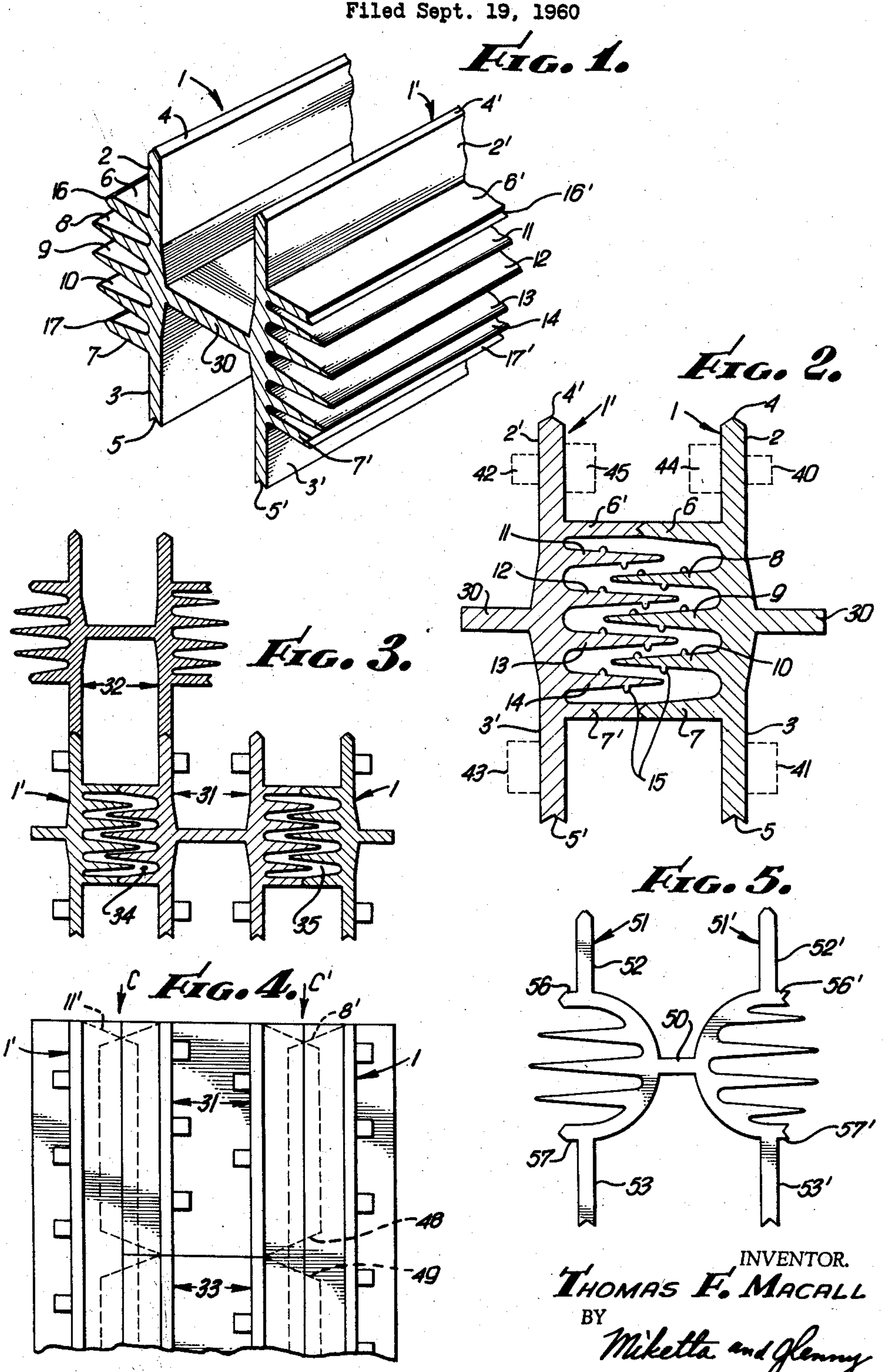
FIG. 1 is an isometric end view of one form of unit embodying the present invention.
FIG. 2 is an end view of an assembly made from the unit illustrated in FIG. 1.
FIG. 3 is an end view of a more complicated arrangement of unit and members, which may be employed in the construction of a more complicated electrical device.
FIG. 4 is a side view of a portion of the assembly illustrated in FIG. 3.
FIG. 5 is a transverse section taken through a modified form of unit.

One of the characteristics of the extruded metal units of the present invention lies in that they are virtually symmetrical and are characterized by having a section approximating an H. A complete unit, as for example, the one illustrated in FIG. 1, comprises two members or mounting plates 1 and 1' joined by a central, longitudinally extending, transverse web 30. The member 1 includes longitudinally extending, component-mounting portions 2 and 3 adjacent the opposing edges 4 and 5 of the member. Similarly, the member 1' has component-mounting portions 2' and 3' adjacent the oppositely directed edges 4' and 5'. Since various electronic or electrical components are to be mounted upon the portions 2, 3, 2' and 3', these portions are preferably planar, the portions 2 and 3 lying in a common plane which is parallel to but spaced from the plane occupied by the portions 2' and 3'; the spacing between the two members 1 and 1' is accomplished by the web 30.

Each of the members 1 and 1' has a longitudinally extending, medial, thinned portion between spaced, longitudinally outwardly and laterally extending wall flanges 6 and 7 (on member 1) and 6' and 7' (on member 1'). Between the wall flanges 6 and 7 there are longitudinally and laterally extending fins 8, 9 and 10. Between the wall flanges 6' and 7' there are longitudinally and laterally extending fins 11, 12, 13 and 14. Each or some of these fins may be provided with longitudinally extending beads or ribs such as 15. It may be noted that these various fins, such as 8, 9 and 10, extend beyond the edges 16 and 17 of wall flanges 6 and 7. Similarly, the outer edges of the fins 11, 12, 13 and 14 extend beyond the lateral edges 16' and 17' of wall flanges 6' and 7'. The fins 8, 9 and 10 are so spaced as to readily fit between the fins 11—14 in the event the entire unit is longitudinally split through the web and the edges 16—16' and 17—17' of the wall flanges are brought into alignment and seated upon one another. It may be noted that the edges 16 and 17 are of a male contour, whereas the edges 16' and 17' are of a female contour complementary to the male contour so as to facilitate the formation of a tight joint between such opposing edges when they are brought into contact.

Attention is called to the fact that in the preferred form of device the oppositely directed edges 4 and 5 of member 1 are similarly contoured, one of them being male and the other female, so as to facilitate nesting alignment and interconnection in the event different sections of such complete units are placed in edge-to-edge contact with one another.

When a unit of the character illustrated in FIG. 1 is cut or split longitudinally through the web 30, two complementary members 1 and 1' are obtained, which members may then be placed in combined relation with the edges of the wall flanges in contact with one another as illustrated in FIG. 2. In such juxtaposition the wall flanges 6 and 6' engage and seat one against the other; the wall flanges 7 and 7' similarly cooperate to form a complete wall or enclosure for the finned conduit through which any suitable coolant may be passed. The two members or mounting plates 1 and 1' are held together in their assembled position by suitable bolts, machine screws, or the like.

It will be noted that the arrangement of various fins 8–14 now provides a tremendously large surface from which the coolant may abstract excessive heat. The component-mounting portions or areas 2, 3, 2' and 3' are available for various electronic or electrical components, such as 40, 41, 42 and 43 (indicated in dash lines and mounted on the external surfaces of the assembly) or similar components 44 and 45 which may be mounted on the inner, opposing surfaces of the members. The exact type of electrical components employed will, of course, depend upon the characteristics of the electrical device which is being constructed. However, attention may be called to the fact that by the use of an insulating compound between the opposing edges of wall flanges 6 and 6', 7 and 7' each of the members or mounting plates 1 may be insulated from the companion mounting plate 1' and the electrical components mounted on a member such as 1 may employ the metal of the mounting plate as a conductor interconnecting all of said components which are mounted upon a section of the plate electrically insulated from longitudinally disposed and adjacent sections of such plate.

FIG. 3 illustrates a more complex assembly made of units and members in accordance with the present invention. As there shown, a complete unit generally indicated at 31 is shown mated with a member 1' on one side and with a member 1 on the other side, thereby providing two, completely enclosed conduits or passageways for coolant (such passageways being generally indicated by the numerals 34 and 35). Another complete unit of the present invention indicated by the numeral 32 is shown positioned immediately above coolant conduit 34, the longitudinal edge areas of the members contained in unit 32 mating with and being seated upon the longitudinal edges of member 1' and one of the members of unit 31. It may be noted that in the preferred form of the present device the spacing between members 1 and 1' (see FIG. 1) is preferably twice the width of each of the wall flanges 6 or 6', so that a complete unit may straddle a combination of members as indicated in FIG. 3.

A side elevation of the arrangement illustrated in FIG. 3 is shown in FIG. 4. It will be evident that the complete unit section 31 is relatively short, and much shorter than the external members 1 and 1'. A further complete unit section 33 is illustrated as being in abutting relation to the unit 31. Coolant, indicated by arrows designated by C and C', is supplied by suitable pumps or blowers and connections to the coolant passageways or conduits 34 and 35.

The ends of the fins contained within these coolant passageways may be inclined or cut at an angle to the longitudinal axis of the units or members and thereby facilitate the generation of turbulent flow through the conduits and the absorption of heat from the fins. The isometric view in FIG. 1 illustrates this angular cutoff to the various fins 8–14. The angular terminus of the fins is also indicated in FIG. 4 at 8' and 11' on the members 1 and 1'. When the abutting ends of aligned units or sections are employed, as for example the abutting ends of units 31 and 33 illustrated in FIG. 4, these inclined ends of the fins, indicated at 48 and 49, form pockets which create turbulent flow as a coolant passes through the duct.

The units of the present invention may assume a variety of forms, coming within the scope of the appended claims. An alternative form of construction is illustrated in FIG. 5 wherein the primary members 51 and 51' are joined by the transverse web 50. The component-mounting portions or areas are indicated at 52 and 53 on member 51 and at 52' and 53' on member 51'. The wall flanges are indicated at 56, 57, 56' and 57' and embrace the various fins therebetween. It will be noticed that even though the component-mounting portions 52 and 53 lie in a common plane, the intervening section of member 51 is somewhat semi-circular and forms a wall for the coolant conduit.

It will be noticed that in the figures, such as 2, 3 and 4, the various elements such as bolts and tie rods which hold the assembly together have not been indicated. Moreover, the representation of electrical components has been eliminated from FIGS. 3 and 4 in order not to confuse the disclosure. The units are capable of producing electrical devices of great complexity, characterized by the compact, space-saving manner in which the components may be mounted on the various surfaces provided for such components.

I claim:

1. A multi-functional, integral, extruded metal unit adapted to provide chassis, conductors and heat sink for electronic components, comprising: a pair of virtually symmetrical members joined by a central, longitudinally extending, transverse web in unitary, back-to-back relationship, each of said members having longitudinally extending component-mounting portions adjacent opposing edges, said portions lying in a plane at right angles to said web; the component-mounting portions of one member being spaced from the component-mounting portions of the other member; each of said members having a longitudinally extending, medial, finned portion between spaced, longitudinally outwardly and laterally extending upper and lower wall flanges, the upper wall flanges lying in a common plane and the lower wall flanges lying in another common plane, each of said finned portions comprising a plurality of longitudinally and laterally extending fins substantially all of which terminate beyond the plane of the edges of said wall flanges, the fins of one of said members being displaced with respect to the fins of the other of said members and with respect to one of said common planes.

2. A unit as stated in claim 1, wherein the oppositely directed edges of said component-mounting portions are of complementary contour to permit said edges of one such unit to seat and mate with edges of another such unit.

3. A unit as stated in claim 1, wherein the width of each of said wall flanges is one-half of the spacing between component-mounting portions of members in a unit.

4. A unit as stated in claim 1, wherein said fins are of tapered section.

5. A unit as stated in claim 1 wherein the end portions of said fins are inclined to the longitudinal axis of the unit.

6. A multi-functional, integral extruded metal unit adapted to provide chassis, conductors and heat sink for electronic components, comprising: a pair of virtually symmetrical members joined by a central, longitudinally-extending transverse web in unitary back-to-back relationship, each of said members having:

(*a*) longitudinally-extending component-mounting portions adjacent opposing edges, said portions lying in a plane at right angles to said web and the component-mounting portions of one member being spaced from the component-mounting portions of the other member and said extruded metal unit being adapted to be longitudinally split at said web and cut transversely into members of desired length;

(*b*) a pair of spaced, longitudinally outwardly and laterally extending wall flanges, the distance between the pair of wall flanges being the same for each member and the longitudinal edges of said wall flanges of a pair of said members being adapted to mate and form an enclosure for coolant; and (*c*) a longitudinally-extending, medial finned portion between said wall flanges, the finned portion comprising a plurality of longitudinally and laterally extending spaced fins, substantially all of which terminate beyond the plane of the edges of said wall flanges, the fins of one of said members being displaced with respect to the fins extending from the other of said members, whereby a plurality of said units may be assembled with the longitudinal edges of said wall flanges in mating relation and with the fins of one unit in an interleaved pattern with the displaced fins of another unit but with the fins of both such units out of contact with each other.

7. A metal unit as stated in claim 6 wherein said pairs of wall flanges are symmetrically located on said members with respect to said transverse web.

8. An extruded metal unit adapted to provide chassis, conductors and heat sink for electronic components, comprising: a pair of virtually symmetrical members joined by mating pairs of spaced, longitudinally inwardly and laterally extending wall flanges in front-to-front relationship, said wall flanges forming an enclsoure for coolant, and each of said members having:

(*a*) longitudinally-extending, component-mounting portions adjacent opposing edges, said portions lying in a plane at right angles to said wall flanges and the component-mounting portions of one member being spaced from the component-mounting portion of the other member; and (*b*) a longitudinally-extending, medial, finned portion between each pair of said wall flanges, the finned portion comprising a plurality of longitudinally and laterally extending fins, substantially all of which terminate beyond the plane of the edges of each pair of said wall flanges and the fins of one pair of wall flanges so that a mutually interleaved pattern is formed with each fin being spaced from its adjacent fins and the end of each fin being spaced from the adjacent member.

References Cited in the file of this patent

UNITED STATES PATENTS

| | | |
|---|---|---|
| 2,809,019 | Newton | Oct. 8, 1957 |
| 2,984,457 | Wulc | May 16, 1961 |